US012732093B2

(12) United States Patent
Song et al.

(10) Patent No.: US 12,732,093 B2
(45) Date of Patent: Sep. 8, 2026

(54) INRUSH CURRENT SUPPRESSION FOR AC-DC POWER SUPPLIES

(71) Applicant: Apple Inc., Cupertino, CA (US)

(72) Inventors: Yantao Song, Northville, MI (US); Abby Cherian, Fremont, CA (US); Qianlai Zhu, San Jose, CA (US); Joselito D Parayno, San Jose, CA (US); Bharat K Patel, San Martin, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 18/360,347

(22) Filed: Jul. 27, 2023

(65) Prior Publication Data

US 2025/0038650 A1 Jan. 30, 2025

(51) Int. Cl.
*H02M 1/32* (2007.01)
*H02M 1/42* (2007.01)

(52) U.S. Cl.
CPC ........... *H02M 1/32* (2013.01); *H02M 1/4208* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H02M 1/42; H02M 1/4208; H02M 1/12; H02M 1/4225; H02M 1/4233; H02M 1/4241; H02M 1/4258; H02M 1/425; H02M 2001/4283; H02M 2001/4291; G05F 1/70
See application file for complete search history.

(56) References Cited

U.S. PATENT DOCUMENTS

| | | | |
|---|---|---|---|
| 5,930,130 A | 7/1999 | Katyl et al. | |
| 6,366,474 B1 | 4/2002 | Gucyski | |

(Continued)

FOREIGN PATENT DOCUMENTS

| | | | |
|---|---|---|---|
| EP | 3432456 A1 | | 1/2019 |
| JP | 2013031335 A | * | 2/2013 |
| WO | 2023082598 A1 | | 5/2023 |

OTHER PUBLICATIONS

JP 2013031335 Translation (Year: 2013).*
International Search Report and Written Opinion for PCT/US2024/035352 dated Oct. 14, 2024; 11 pgs.

*Primary Examiner* — Bryan R Perez
(74) *Attorney, Agent, or Firm* — FLETCHER YODER PC

(57) ABSTRACT

A power supply can include a bulk capacitor that receives a DC bus voltage; one or more DC-DC converters that convert the DC bus voltage to a DC output voltage; an inrush current limiting circuit that includes a resistor coupled in series with the bulk capacitor so as to limit an inrush current to the bulk capacitor; and a solid-state switching device that selectively bypasses the resistor once the bulk capacitor is charged; and control circuitry that operates the solid-state switching device to selectively bypass the resistor once the bulk capacitor is charged. The inrush current limiting circuit can further include a relay responsive to the control circuitry that selectively bypasses the resistor under high load conditions once the bulk capacitor is charged; and the control circuitry can further operate the solid-state switching device to selectively bypass the resistor once the bulk capacitor is charged under low load conditions.

12 Claims, 10 Drawing Sheets

(56) References Cited

U.S. PATENT DOCUMENTS

| | | | | |
|---|---|---|---|---|
| 6,781,351 | B2 | 8/2004 | Mednik et al. | |
| 7,068,016 | B2 | 6/2006 | Athari | |
| 9,379,618 | B2 | 6/2016 | Freeman et al. | |
| 10,338,658 | B2 | 7/2019 | Hung et al. | |
| 10,432,097 | B2 | 10/2019 | Lind et al. | |
| 10,812,069 | B1 * | 10/2020 | Boulaknadal | E21B 4/04 |
| 11,489,438 | B2 | 11/2022 | Xie et al. | |
| 11,491,883 | B2 * | 11/2022 | Khaligh | H02M 7/797 |
| 2006/0274468 | A1 * | 12/2006 | Phadke | H02H 9/001<br>361/93.1 |
| 2009/0206073 | A1 * | 8/2009 | Kinoshita | H05B 6/683<br>219/715 |
| 2015/0194905 | A1 | 7/2015 | White et al. | |
| 2021/0296981 | A1 | 9/2021 | Neudorf et al. | |
| 2021/0399620 | A1 | 12/2021 | Mayell et al. | |
| 2023/0299684 | A1 * | 9/2023 | Liu | B60L 1/00<br>307/9.1 |
| 2024/0308366 | A1 | 9/2024 | Wang | |

* cited by examiner

900

911

AC INPUT VOLTAGE / V 300
200
100
0
−100
−200
−300

913

BULK CAP VOLTAGE / V 350
300
250
200
150
100
50
0

915

INRUSH CURRENT / kA 50
40
30
20
10
0

0 2 4 6 8 10 12 14 16 18 20

INRUSH CURRENT SUPPRESSION FOR AC-DC POWER SUPPLIES

BACKGROUND

Switching power supplies are used in a wide variety of applications. In some applications, such switching power supplies may include relatively large bulk capacitors that can cause large inrush currents.

SUMMARY

Mitigating large inrush currents may be advantageous in various applications, including applications relating to switching power supplies. To that end, such power supplies may be provided with inrush current limiting circuits.

A power supply can include one or more input stages that receive an AC input voltage and produce a DC bus voltage; a bulk capacitor that receives the DC bus voltage; a low power DC-DC converter that converts the DC bus voltage to a first DC output voltage; a high power DC-DC converter that converts the DC bus voltage to a second DC output voltage connectable in parallel with the first DC output voltage; control circuitry that selectively enables and disables the high power DC-DC converter responsive to load conditions; and an inrush current limiting circuit. The inrush current limiting circuit can include a resistor coupled in series between the one or more input stages and the bulk capacitor so as to limit an inrush current to the bulk capacitor; a relay responsive to the control circuitry that selectively bypasses the resistor under high load conditions once the bulk capacitor is charged; and a solid-state switching device responsive to the control circuitry that selectively bypasses the resistor under low load conditions once the bulk capacitor is charged.

The one or more input stages that receive an AC input voltage and produce a DC bus voltage can further include a rectifier that receives the AC input voltage and produces a rectified AC voltage; and a power factor correction converter that receives the rectified AC voltage and produces the DC bus voltage. The resistor can be a negative temperature coefficient thermistor, a positive temperature coefficient thermistor, or a regular resistor. The relay can have contacts coupled in parallel with the resistor and a coil driven by the control circuitry. The solid-state switching device can include a MOSFET having source and drain terminals coupled in parallel with the resistor and a gate driven by the control circuitry. A gate driver can be interposed between the control circuitry and the gate of the MOSFET. A gate drive and isolator can be interposed between the control circuitry and the gate of the MOSFET.

A power supply can include a bulk capacitor that receives a DC bus voltage; one or more DC-DC converters that convert the DC bus voltage to a DC output voltage; an inrush current limiting circuit that includes a resistor coupled in series with the bulk capacitor so as to limit an inrush current to the bulk capacitor; and a solid-state switching device that selectively bypasses the resistor once the bulk capacitor is charged; and control circuitry that operates the solid-state switching device to selectively bypass the resistor once the bulk capacitor is charged.

The power supply can further include a rectifier that receives an AC input voltage and produces a rectified AC voltage; and a power factor correction converter that receives the rectified AC voltage and produces the DC bus voltage. The inrush current limiting circuit can further include a relay responsive to the control circuitry that selectively bypasses the resistor under high load conditions once the bulk capacitor is charged; and the control circuitry can further operate the solid-state switching device to selectively bypass the resistor once the bulk capacitor is charged under low load conditions. The relay can have contacts coupled in parallel with the resistor and a coil driven by the control circuitry. The solid-state switching device can be a MOSFET. The MOSFET can have source and drain terminals coupled in parallel with the resistor and a gate driven by the control circuitry. A gate driver can be interposed between the control circuitry and the gate of the MOSFET. A gate drive and isolator can be interposed between the control circuitry and the gate of the MOSFET.

A power supply can include a bulk capacitor that receives a DC bus voltage; one or more DC-DC converters that convert the DC bus voltage to a DC output voltage; an inrush current limiting circuit that includes a solid-state switching device coupled in series with the bulk capacitor so as to limit an inrush current to the bulk capacitor; and control circuitry that operates the solid-state switching device responsive to bulk capacitor voltage to limit an inrush current to the bulk capacitor. The solid-state switching device can be a MOSFET operated in the active region to limit the inrush current to the bulk capacitor and operated in the saturation region to improve operating efficiency once the bulk capacitor is charged. The power supply can further include a rectifier that receives an AC input voltage and produces a rectified AC voltage; and a power factor correction converter that receives the rectified AC voltage and produces the DC bus voltage.

DETAILED DESCRIPTION

Figure 1:
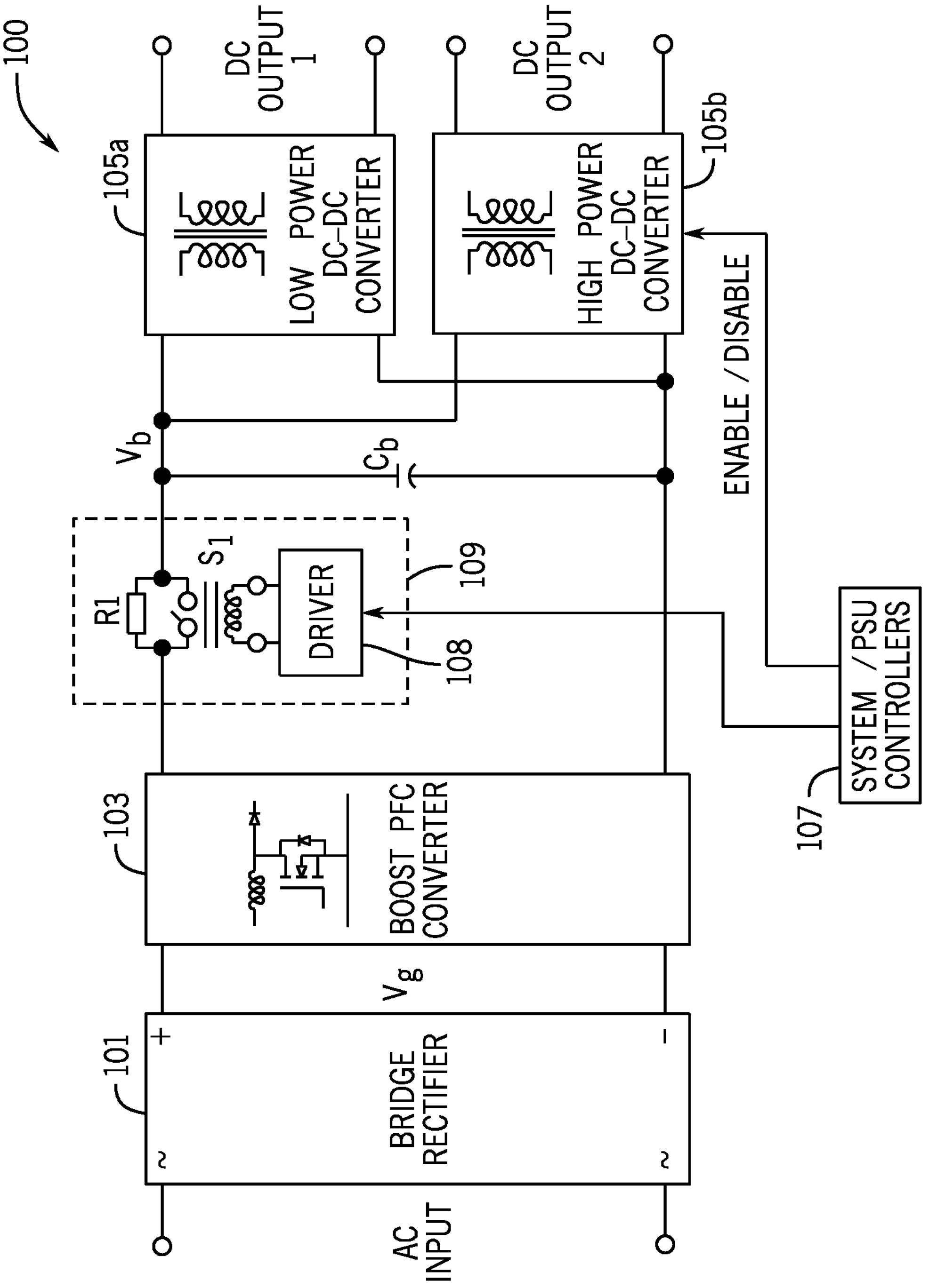
FIG. 1 illustrates a single-phase AC-DC power supply.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

AC-DC power supplies can be used to convert alternating current (AC) electricity to direct current (DC) electricity, which can in turn be used by electronic devices. FIG. 1 illustrates an exemplary configuration of a single-phase high power AC-DC power supply 100. In some embodiments, AC-DC power supply 100 may be designed for "universal" AC input, meaning it is operable on mains voltages ranging from e.g., 90-264 Vrms (to accommodate different line voltages supplied in various regions of the world) and mains frequencies ranging from e.g., 47-63 Hz (to accommodate the 50 Hz and 60 Hz grid frequencies used in various regions of the world). In the exemplary AC-DC power supply 100, rectifier bridge 101 converts AC power to DC power. Various rectifier configurations using combinations of passive components (e.g., diodes) and/or active components (e.g., switching devices such as transistors, thyristors, etc.) can be used. Power factor correction (PFC) converter, which may be provided for power supplies operating at relatively higher power levels (e.g., above about 50-70 W) could be a single-phase or multiple-phase boost converter. Various boost/PFC designs and control strategies are available to meet the requirements of different applications and/or regulatory requirements. Bulk capacitor Cb can be provided to accommodate requirements relating to holdup time (i.e., how long the output can remain energized in the event of an input power failure), load transients (i.e., how the power supply responds to load increases or decreases), and pulsating power buffer, etc. In some embodiments, DC-DC converter(s) 105*a*, 105*b* can provide galvanic isolation, e.g., by use of isolated converter(s), and can also provide regulation of the output voltage(s). Isolated DC-DC converters can be implemented using a variety of topologies, such as resonant LLC converters, flyback converters, etc. If galvanic isolation is not required, still other topologies could also be used.

To achieve ever-higher operating efficiencies, reducing no-load and light-load power losses can become increasingly important, including in relatively high power AC-DC power supplies (e.g., a few to several hundred watts), such as might be used with desktop computer systems, computer workstations, and servers, as well as other types of loads. In some applications, designs using two parallel DC-DC converters (105*a*, 105*b*) may be employed. In such cases, a low power converter 105*a* may be designed with a relatively lower power level (e.g., 75 W or less), so it can operate without boost/PFC converter 103 being in operation, further improving efficiency. Thus, when the system operates in no/light load condition, low power converter 105*a* can be operated to provide power to the system load, and the high power converter 105*b* can be disabled. This can result in lower total system power losses. As the system enters higher loading conditions, high power converter 105*b* can be enabled to power the system. This architecture can achieve high power conversion efficiency from no load to full load. High power converter 105*b* can be selectively enabled/disabled by controller 107, which can be a system controller of the system powered by the power supply or by a local controller inside the power supply unit, either of which can be responsive to system loading conditions. In either case, controller 107 can be implemented using any suitable combination of analog, digital, and/or programmable circuitry that may be discrete and/or integrated circuits. DC Output 1 of low power converter 105*a* and the DC Output 2 of high power converter 105*b* can be either directly paralleled inside power supply 100 or can paralleled through some other mechanism at the system level.

For higher power applications (e.g., on the order of a few to several hundred watts or more), bulk capacitor Cb can have a capacitance on the order of hundreds of micro-Farads (μF). When the AC input is plugged in or otherwise connected to such a system, and the power supply proceeds through the start process, the AC input can perceive what can be very nearly a short-circuit through bulk capacitor Cb and the low loop impedance. As a result, a very large inrush current can be generated. In some cases, this inrush current may have sufficient magnitude to trigger a circuit breaker in the mains circuit, blow one or more fuses inside the power supply, and/or even potentially damage components inside the power supplies. To limit the inrush current, an inrush current limiting circuit 109 can be provided.

In some embodiments, inrush current limiting circuit 109 can include a resistor R1 that is inserted in series between the AC input and the bulk capacitor Cb, e.g., after boost/PFC converter 103. Resistor R1 can be a regular resistor, a negative temperature coefficient (NTC), or positive temperature (PTC) thermistor. Unless expressly noted otherwise or clear from context, any or all such device types are intended to be included when "resistor" is used herein. An NTC thermistor's resistance will decrease as it heats up from the current flowing therethrough. In such cases, when the AC input is connected (e.g., when the device is plugged in), resistor R1 provides a resistance that can significantly reduce the inrush current. During continuous operation, even if resistor R1 is an NTC thermistor whose resistance decreases to a lower value because of the temperature increase, such a resistor may still cause significant power loss that can adversely impact the overall efficiency of the power supply. To reduce power loss caused by resistor R1, inrush current limiting circuit 109 can further include a relay S1, which can be placed with its contacts in parallel with resistor R1. When the AC input is connected, but before bulk capacitor Cb is fully charged, relay S1 can be controlled to open its contacts, forcing the current to flow through resistor R1. As bulk capacitor Cb charges to a voltage at or near the peak value of AC input voltage, relay S1 can be controlled to close its contacts, thereby bypassing resistor R1. Relays used in such applications can have a contact resistance on the order of milliohms (m (2), and thus it can have much lower conduction losses than resistor R1. Control of the relay can be implemented by controller 107, which can sense the voltage across bulk capacitor Cb and control the relay accordingly.

Although relay S1 can significantly reduce power losses associated with inrush current limiting resistor R1, the driving losses of the relay can also be significant and can become a further hinderance reducing no-load and light-load power losses. More specifically, relay S1 may be implemented as a mechanical switch with its closing/opening controlled by energizing/de-energizing an electromagnetic coil, and the coil must be constantly energized with sufficient current to maintain the relay contacts being fully closed. This is a so called (normally open or N.O.) relay. Although normally closed (N.C.) relays could be used, in which case the contacts in parallel with resistor R1 are closed unless the relay coil is energized, such relays may not be suitable for all applications, as the time required for the relay to open upon powering up the system may be long enough for significant inrush current to occur. In any case, using as an example a typical 250 Vac/10 A relay, the coil may consume as much as 200 mW power to maintain the relay contacts in their closed position. This driving power is independent of the current flowing through the relay contacts. Thus, the relay's driving power may pose a limit to attaining even higher operating efficiencies.

Figure 2:
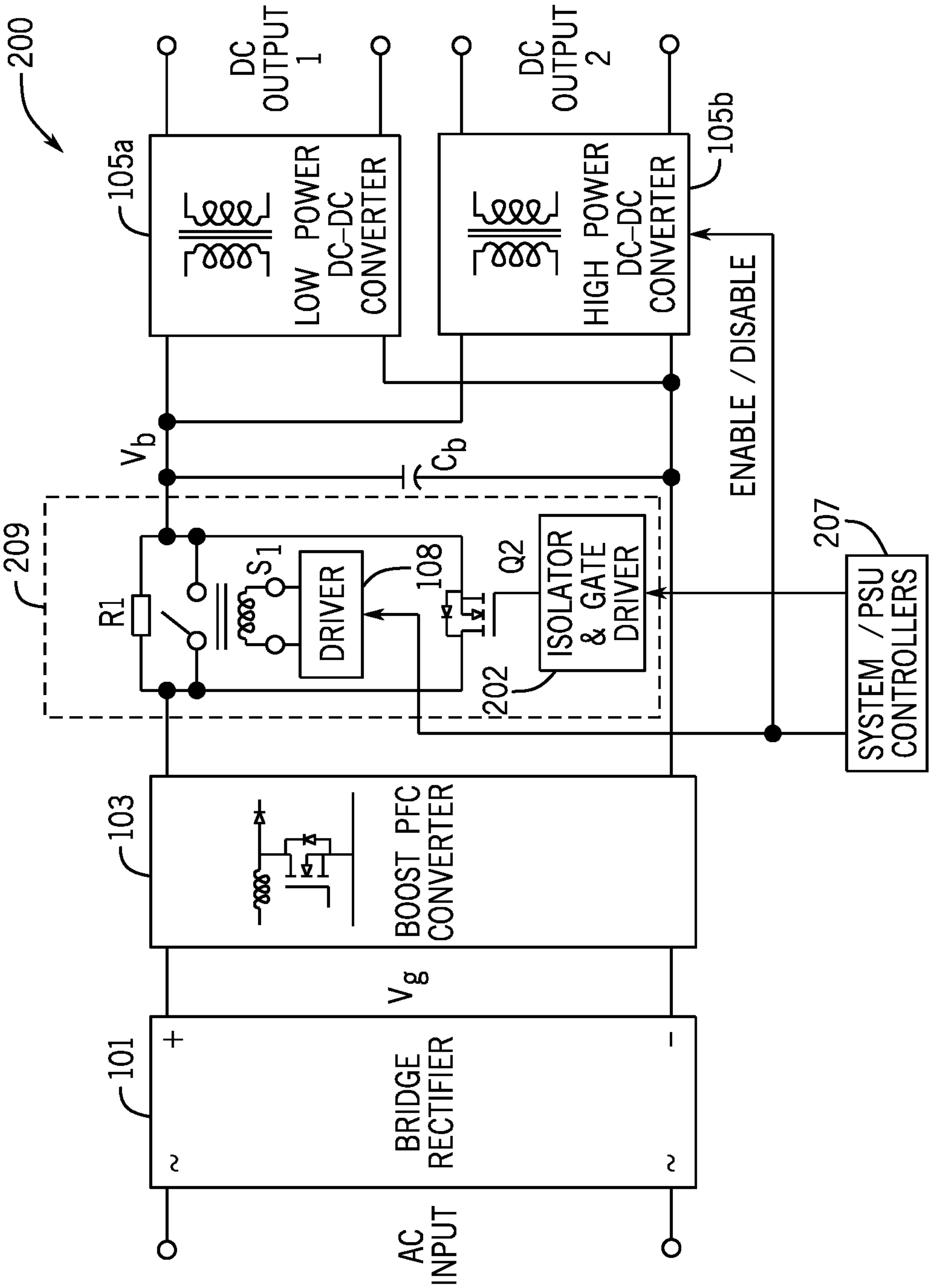
FIG. 2 illustrates a single-phase AC-DC power supply with a first implementation of an inrush current suppression circuit.

To overcome these limitations of the illustrated inrush current limiting circuit 109, an alternative inrush current suppression circuit 209 is illustrated in FIG. 2 as applied to power supply 200. Inrush current suppression circuit 209 includes a resistor R1 (which can be as described above), a relay S1 (which can be as described above), and solid-state switching device (e.g., metal-oxide-semiconductor field effect transistor, i.e., MOSFET) Q2, and associated control and driving circuits 202. Although solid-state switching device is illustrated as a MOSFET, other solid-state switching device types could be used in various applications, including other semiconductor transistor types, other semiconductor switch types, and even solid-state relays in some applications. The semiconductor devices can be implemented using any suitable semi-conductor technology including silicon (Si), silicon carbide (SiC), gallium nitride (GaN), etc.

In any case, resistor R1 can perform as described above, i.e., limiting inrush current when AC source is connected (e.g., plugged in). After bulk capacitor Cb is sufficiently charged, solid-state switching device Q2 can be turned on to bypass resistor R1, so that the high power loss across resistor R1 can be avoided. As above, this can be controlled by controller 207, which, similar to controller 107 described above, can be a system controller or a local controller in the power supply. When the system operates in no-load and light-load conditions, low power converter 105*a* can be operated to power the system, and high power converter 105*b* can disabled. At the same time, solid-state switching device Q2 can be turned on, with relay S1 being de-energized with its contacts so that relay S1 does not consume any power. Because solid-state switching device Q2 requires less power to drive (and the power consumed by its driver circuit is also quite low), the total power loss associated with inrush current limiting circuit 209 can be negligible, which in turn can enable lower power consumption and higher efficiency of the entire system when operating in no-load and light-load conditions. As the system load increases, high power DC-DC converter 105*b* can be enabled to power the system. At the same or about the same time, relay S1 can be energized to reduce the conduction losses associated with solid-state switching device Q2. This is the case because the relay contact resistance can be lower than the resistance of solid-state switching device Q2 (e.g., the channel resistance Rds-on of a MOSFET). Additionally, the added power consumption associated with the relay drive current is a much smaller fraction of the high load power of the system than it is of the no-load/low-load power consumption of the system, meaning that operating the relay under high load conditions results in a smaller impact on overall system efficiency.

Control of solid-state switching device Q2 can be straightforward. When operating in no-/low-load condition such that low power converter 105*a* is operating and high power converter 105*b* is disabled, and once bulk capacitor Cb is suitably charged (e.g., equal to or about the peak value of the AC input voltage), solid state switching device Q2 can be turned on. In the illustrated configuration an additional isolator may be needed to drive solid-state switching device Q2 if it is implemented as a MOSFET. There are (at least) two techniques for controlling relay S1. The first technique can be to enable the high power converter 105*b* and to energize relay S1 at the same time and by the same control signal. Alternatively, the second technique can be to energize/de-energize relay S1 as the load increases above or decreases below a level that the conduction loss of solid-state switch device Q2 is equal to the power consumption of the relay S1 coil. Other control strategies may also be possible.

Figure 3:
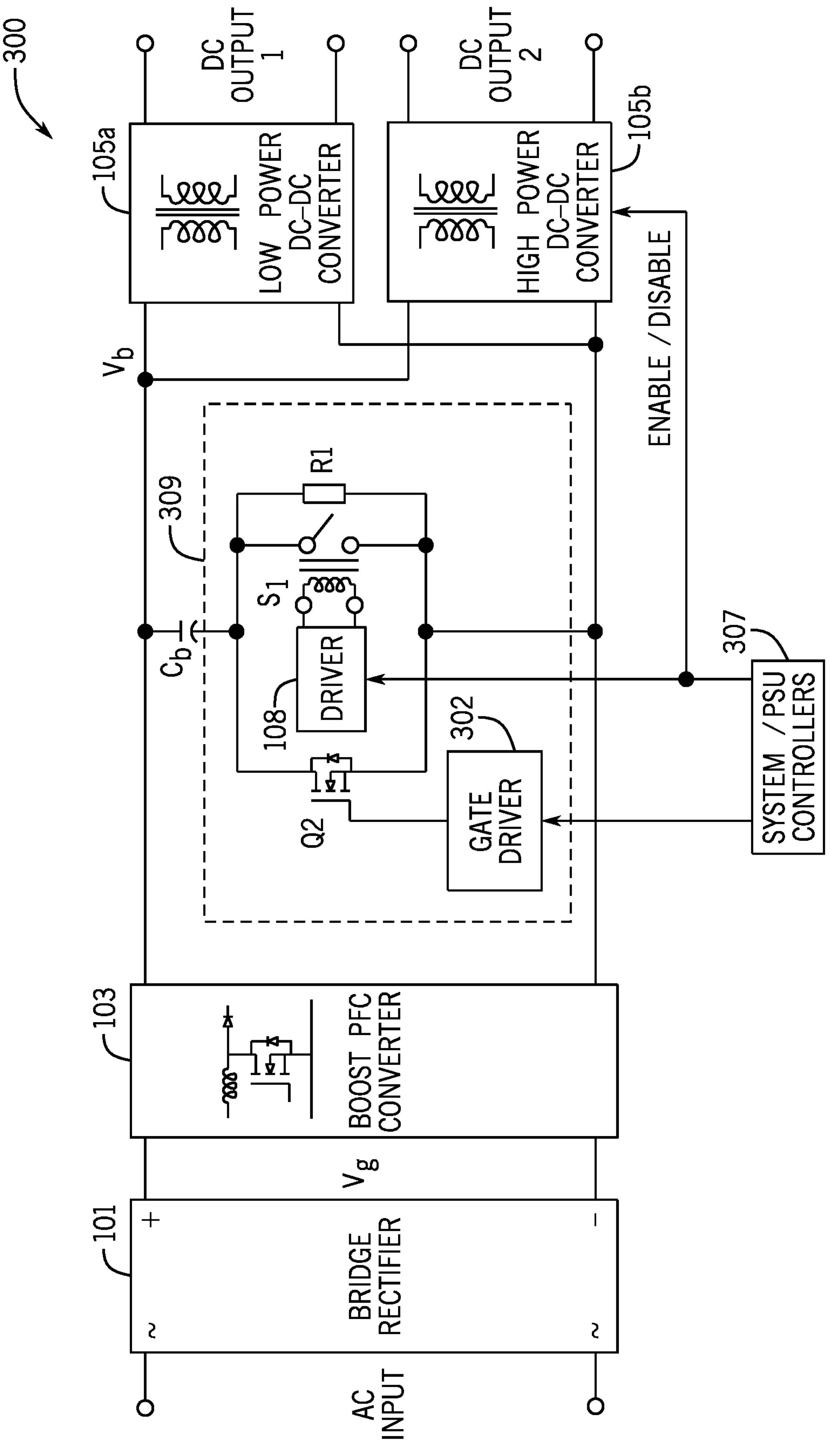
FIG. 3 illustrates a single-phase AC-DC power supply with a second implementation of an inrush current suppression circuit.

FIG. 3 shows a second implementation of an inrush current limiting circuit 309 similar to that described above applied to a power supply 300. In this implementation, inrush current limiting circuit 309 is moved to be in series with the bulk capacitor Cb, and the solid-state switching device Q2 shares the same reference ground with boost/PFC converter 103 and the low and high power converters 105*a*, 105*b*. As a result, if solid-state switching device Q2 is implemented as a MOSFET, gate driver 302 of solid-state switching device Q2 can be implemented more easily and with lower cost because an isolated gate driver is not needed. Additionally, in this configuration, only the ripple current flows through solid-state switching device Q2 and relay S1. This can reduce the RMS current flowing through them by around 40%, which can further reduce the power loss associated with the inrush current limiting circuit 309. Other components of power supply 300 can be as described above.

Figure 4:
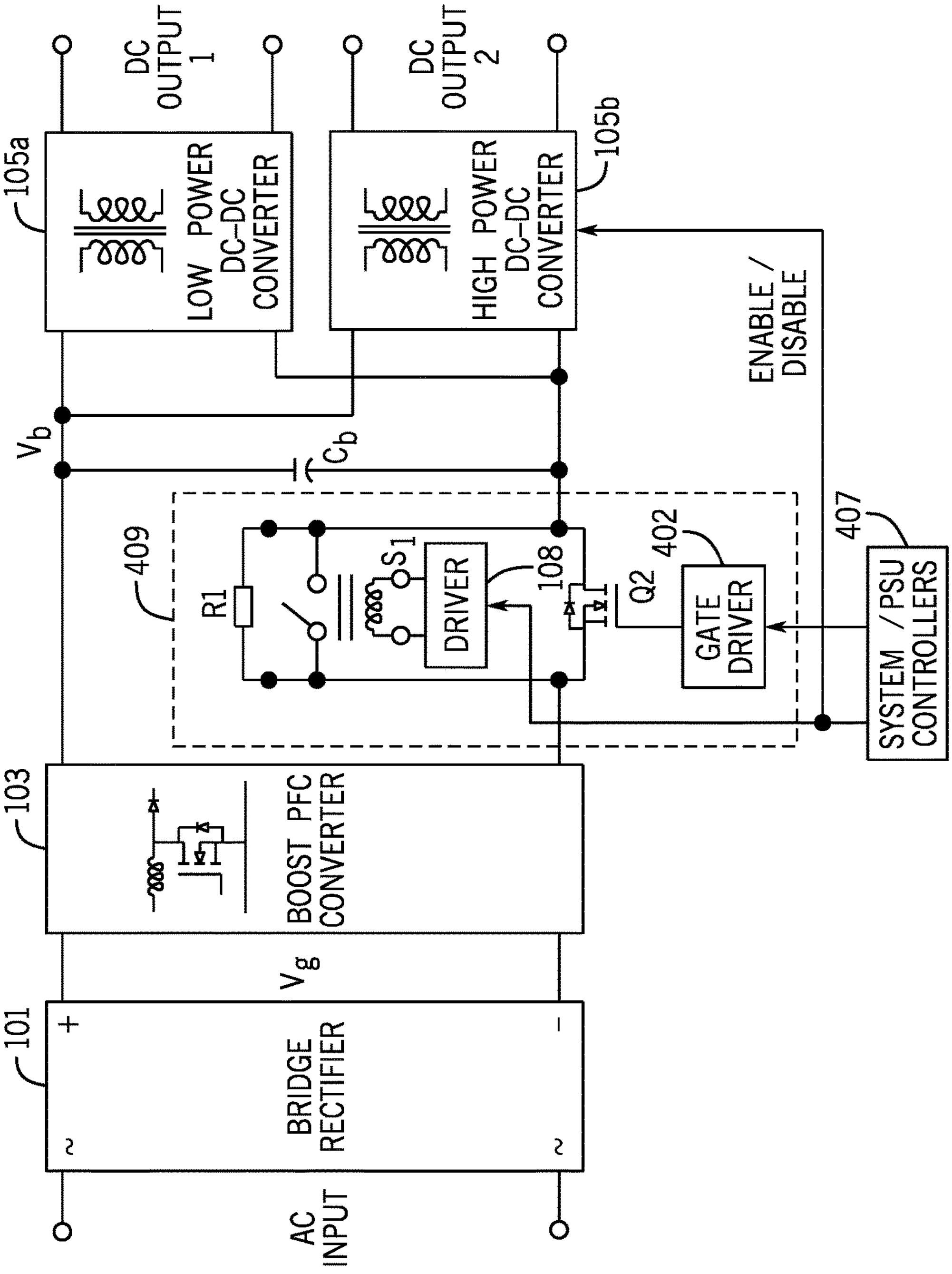
FIG. 4 illustrates a single-phase AC-DC power supply with a third implementation of an inrush current suppression circuit.

FIG. 4 illustrates another variant of an inrush current limiting circuit 409, in which the current limiting circuit 409 is moved to the negative bus of power supply 400. As a result, gate driver 402 for solid state switching device Q2 need not include an isolator, allowing solid-state switching device Q2 to be more easily driven. Otherwise, the components of power supply 400 are as described above, including relay driver 108 and gate driver 402 under control of controller 407, which, as noted above, can be either a system level controller or a controller local to the power supply.

Figure 5:
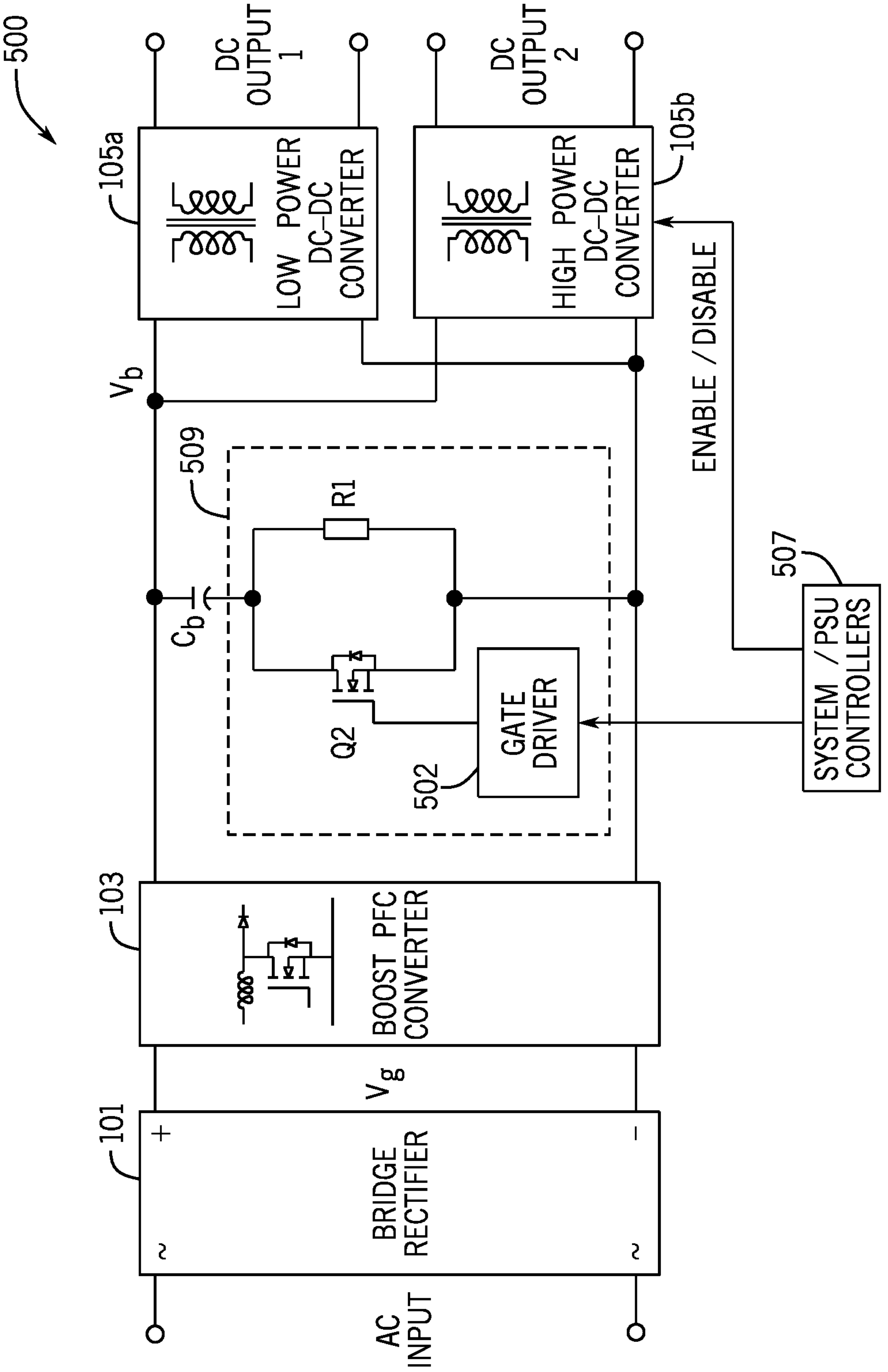
FIG. 5 illustrates a single-phase AC-DC power supply with a fourth implementation of an inrush current suppression circuit.

FIG. 5 illustrates a cost-saving implementation of an inrush current limiting circuit 509 applied to a power supply 500. In some applications, the conduction resistance of a solid-state switching device Q2 may be sufficiently low as to be comparable to the contact resistance of a relay. Additionally or alternatively, component cost and/or printed circuit board (PCB) space may pose more stringent limitations. In either case, the relay can be omitted, and solid-state switching device can be provided in parallel with a resistor R1 to perform the inrush current limiting function, as described above. As before, the gate driver 502 for solid-state switching device Q2 can be controlled by controller 507. In the example of FIG. 5, once bulk capacitor Cb is sufficiently charged (e.g., at or close to the peak AC voltage of the AC input), the solid-state switching device Q2 can be latched on for all loading conditions of power supply 500.

Figure 6:
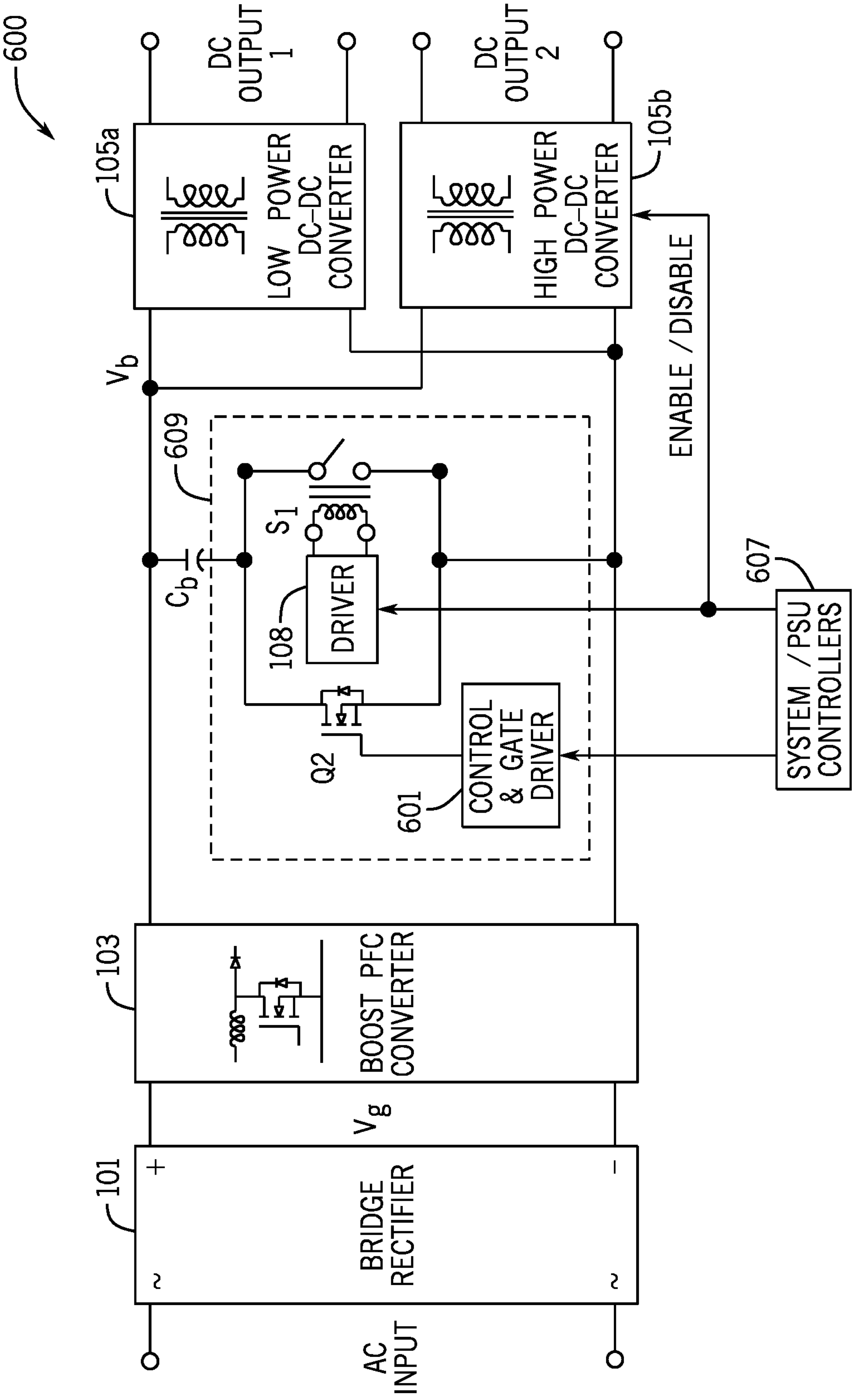
FIG. 6 illustrates a single-phase AC-DC power supply with a fifth implementation of an inrush current suppression circuit.

In power supply 600, shown in FIG. 6, the resistor R1 can be eliminated from the inrush current limiting circuit 609. In this configuration, the combination of relay S1 and solid-state switching device Q2 can be used to suppress the inrush current. As the AC source is connected, relay S1 is open, and the gate voltage of solid-state switching device Q2 can be controlled (by control and gate driver 601) so that it operates as a voltage-controlled current source. For example, the gate voltage can be controlled to an appropriate value so that the drain current is limited under a specified threshold (e.g., 50 A), and therefore, the AC input inrush current of power supply 600 is limited under 50 A. As bulk capacitor is acceptably charged (e.g., reaching or approaching the peak value of the AC input voltage), controller 607 can increase the gate voltage above 10V (or other suitable level), so solid-state switching device Q2 is fully turned on. In other words, solid-state switching device Q2 operates as a resistor. As the system load increases, high power converter 105*b* can be powered on to supply the system load. At this time (or other suitable time, as described above), the relay S1 can be energized, so that both solid-state switching device Q2 and relay S1 are simultaneously "closed" to reduce the conduction loss of inrush current limiting circuit 609. If the system load decreases below a pre-set level, high power converter 105*b* can be disabled by controller 607, and relay S1 can also be de-energized (also by controller 607), so that only the low power DC-DC converter and the MOSFET Q2 is in operation.

The more advanced control strategy for the relay S1 described above can be adopted to further optimize the power loss of the inrush-current listing circuit 609 shown in FIG. 6. For example, solid-state switching devices can have negligible driving losses but may have higher conduction losses. Conversely, the relay S1 may have much higher driving losses but lower conduction losses. Therefore, relay S1 can be energized when the system load increases above the loading point where the conduction loss of solid-state switching device Q2 is equal to the driving loss of relay S1. In some applications, the exact cross-over point may not be known precisely, and a controller that approximates this point by any suitable technique may be used.

Figure 7:
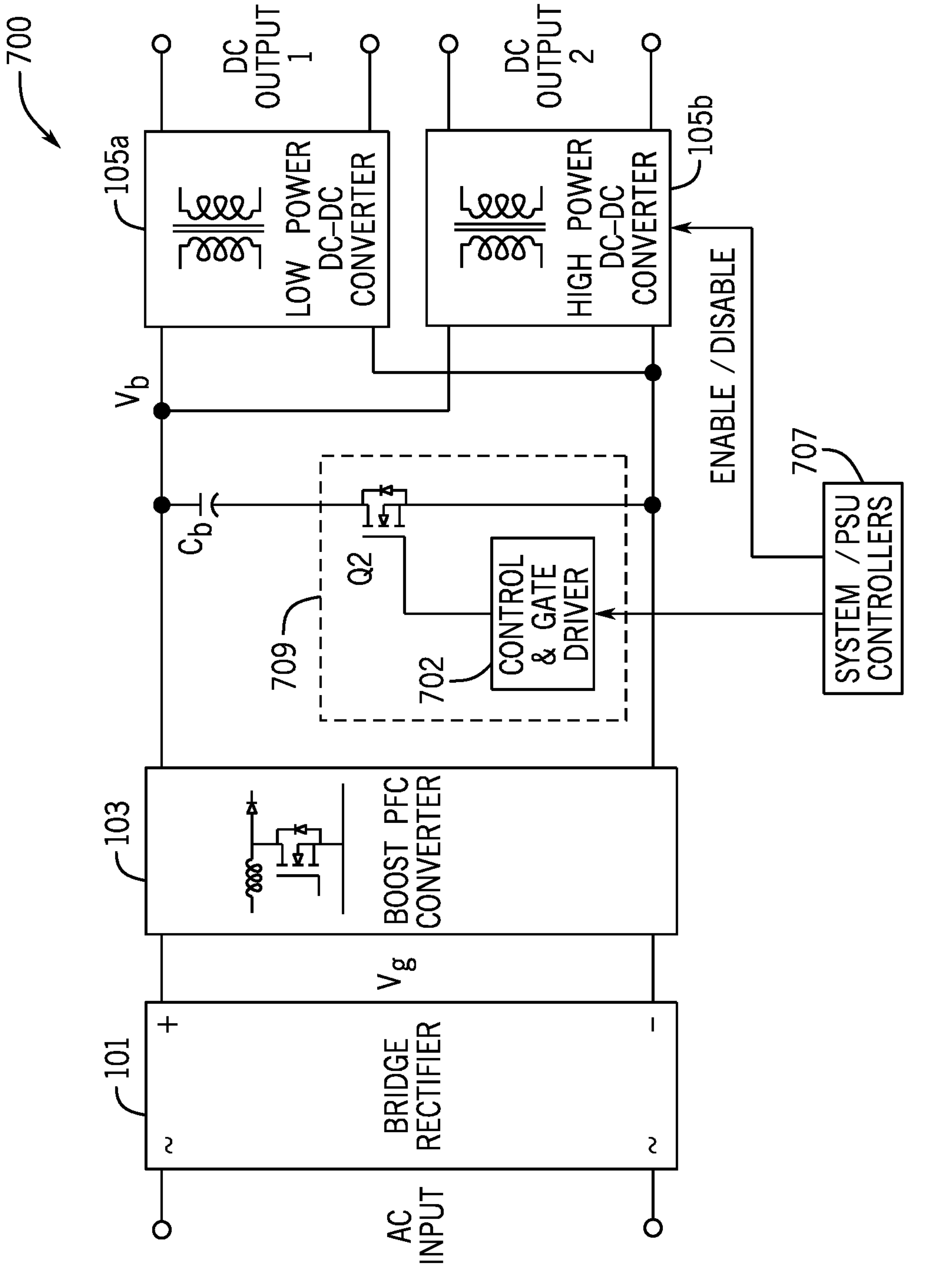
FIG. 7 illustrates a single-phase AC-DC power supply with a sixth implementation of an inrush current suppression circuit.

FIG. 7 illustrates a power supply 700 with a simplified inrush current limiting circuit 709. In this embodiment, only a solid-state switching device Q2 (i.e., without relay S1) can be used to suppress the AC input inrush current. As one exemplary embodiment, solid-state switching device Q2 can be a MOSFET that operates in two regions, the active region, and the saturation region. When AC is plugged in, the solid-state switching device Q2 gate voltage can be controlled by controller 707 to make Q2 operate in its active region. Solid-state switching device Q2 thus operates as a gate-voltage-controlled current source. For example, the gate voltage can be controlled (e.g., by controller/gate driver 702 acting alone or in conjunction with controller 707) to an appropriate value so that its drain current is limited to under 50 A. As a result, the charging current of the bulk capacitor Cb can be limited to less than 50 A, and correspondingly the AC input inrush current of the power supply can be limited under 50 A. As the bulk capacitor Cb becomes adequately charged, increasing the gate voltage above 10V (again by controller/gate driver 702 and optionally controller 707) can fully turn on solid state switching device Q2.

Figure 8:
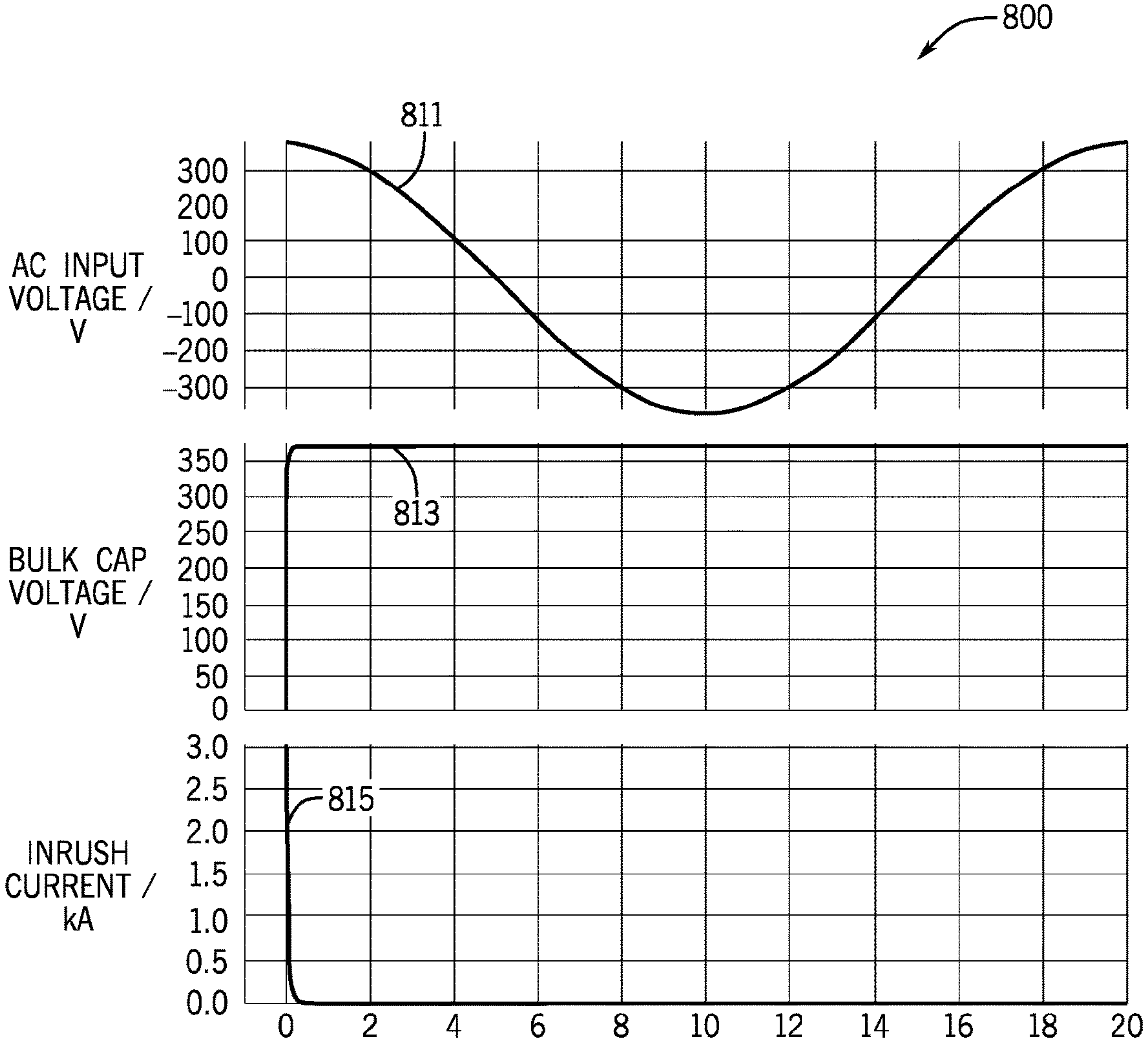
FIG. 8 illustrates inrush current of an AC-DC power supply without inrush current suppression circuitry when the AC input is plugged in at a 90-degree phase angle.

In each of the embodiments described above, the root cause of the inrush current for AC-DC power supplies is that a high voltage is applied to the bulk capacitor Cb, and the bulk capacitor Cb is very rapidly charged to the peak AC input voltage when the AC input is connected. FIG. 8 is a plot 800 showing an exemplary inrush current waveform 815 and bulk capacitor voltage waveform 813 when the initial connection occurs at the peak of the AC input voltage waveform 811. More specifically, when the AC input is connected at the phase angle of 90 degree (i.e., peak voltage), the instantaneous AC input voltage can be, for example, 370V, and this instantaneous voltage is applied to a fully depleted bulk capacitor. Based on the capacitor physics, the capacitor is very rapidly charged to 370V, as illustrated by bulk capacitor voltage waveform 813. In this simulated example, the bulk capacitor is charged to above 300V in one microsecond, so a huge inrush current of 3 kA is generated, as illustrated by inrush current waveform 815

Figure 9:
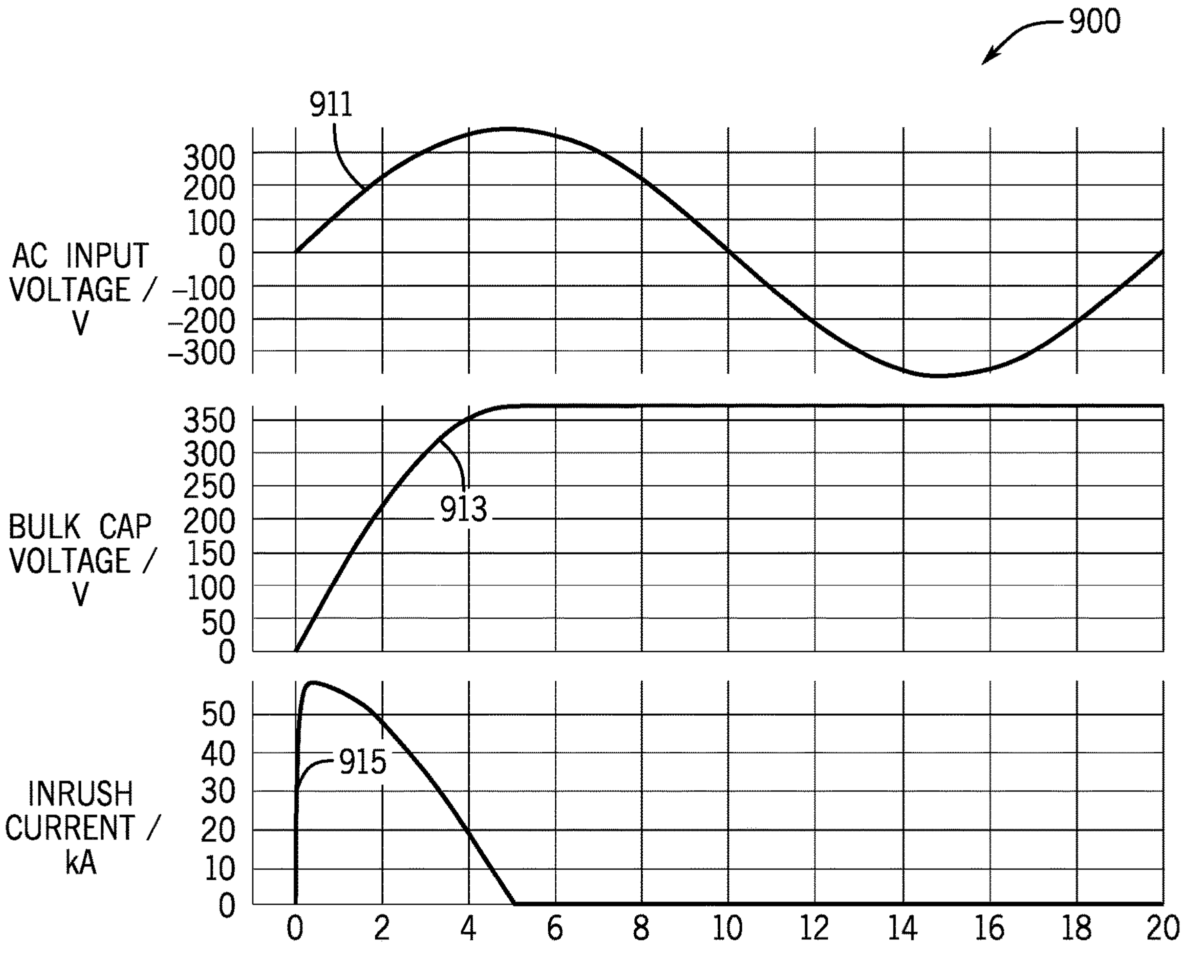
FIG. 9 illustrates inrush current of an AC-DC power supply without inrush current suppression circuitry when the AC input is plugged in at a 0-degree phase angle.

Alternatively, FIG. 9 shows a different scenario, in which the AC input is connected at the phase angle of 0 degrees of AC input voltage waveform 911, i.e., when the instantaneous AC voltage is 0 V. As a result, the initial voltage applied to bulk capacitor Cb is 0 V. Then, the bulk capacitor voltage increases as the instantaneous AC voltage increases to its peak value following a quasi-sinusoidal shape as depicted by bulk capacitor voltage waveform 913. As in the preceding example, the bulk capacitor Cb is charged to the peak value 370V of the AC input, but this takes place over approximately one-fourth of the AC line cycle (e.g., 5 ms at 50 Hz). As a result, the peak inrush current is only 60 A, as illustrated by inrush current waveform 915. In fact, the inrush current of an AC-DC power supply depends on the phase angle at which AC input voltage is applied to the bulk capacitor. When AC input is applied to the bulk capacitor at 90 degrees, a huge inrush current will be generated. However, when AC input voltage is applied to the bulk capacitor at zero-crossing point, the inrush current is much lower and is unlikely to cause components damage or trigger any fuse, circuit breaker, or other overcurrent protection.

As described above with respect to FIGS. 6 and 7, an advanced control strategy was employed to manage the turn-on timing of the solid-state switching device Q2. In such implementation, solid-state switching device may be a transistor or other device including-active and saturation regions as opposed to a solid-state switching device implementing a pure on-off function, such as a solid-state relay. Such switching devices can be operated so that the AC input voltage is always initially applied to the bulk capacitor Cb at the zero crossing point of the AC input voltage (i.e., an instantaneous value of 0V) no matter the moment at which the AC input voltage is connected.

Figure 10:
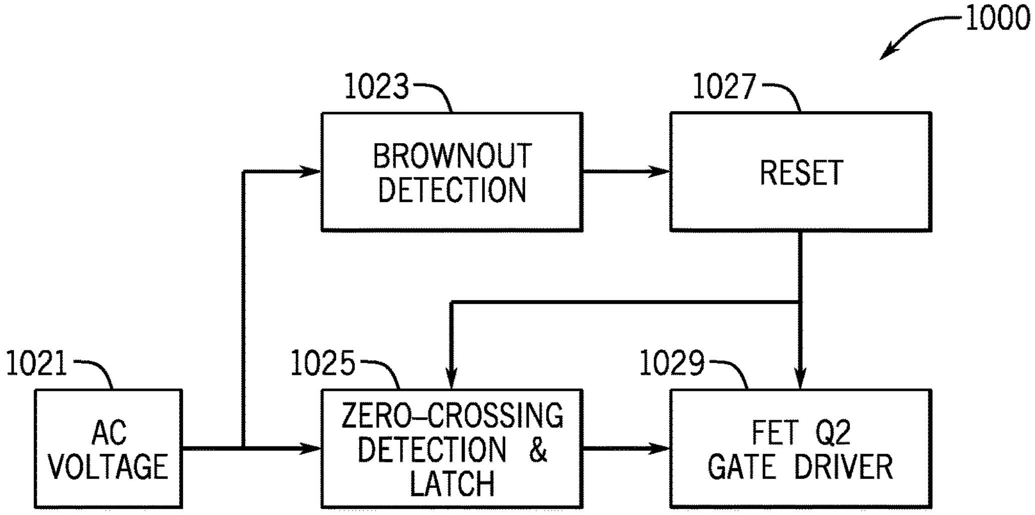
FIG. 10 illustrates a control strategy for inrush current suppression circuits as described herein.

FIG. 10 illustrates the functional blocks of such a control strategy. In the exemplary embodiments of FIGS. 6 and 7, when AC input voltage is connected, the solid-state switching device (e.g., MOSFET) Q2 is turned off, so that the AC input voltage is applied to solid-state switching device Q2, rather than the bulk capacitor Cb. As a result, there is initially no current to charge the bulk capacitor Cb. After AC input voltage is connected, the AC voltage 1021 can be monitored by a zero-crossing detection and latch circuit 1025 (which can be a part of controller 607/707. Once a zero crossing of the AC input voltage is detected, the solid-state switching device Q2 as illustrated in FIGS. 6 and 7 can be fully turned on (by gate driver 1029, which can be part of the controller 607/707 or a separate circuit), applying the instantaneously zero AC input voltage to the bulk capacitor Cb. As a result, the bulk capacitor Ch can be gradually charged from zero to the peak AC voltage over about one-fourth of the AC cycle following a quasi-sinusoidal curve as described above with respect to FIG. 9. Therefore, the inrush current can be significantly reduced to a safe level, and no other components may be needed to limit the inrush current.

During the continuous operation of the AC-DC power supply 600/700 as illustrated in FIGS. 6 and 7, the AC input voltage 1021 can also be monitored by a brownout detection circuit 1023 (which can also be part of controller 607/707). If the AC input voltage falls below a preset threshold, the AC-DC power supply can be shut down to protect components from current and temperature beyond limits. At the same time, the zero-crossing and latching circuitry 1025 can be reset and Q2 can be turned off (by gate driver circuit 1029), therefore the proposed inrush current limiting circuit can be reset (block 1027) to be ready for AC input voltage reconnection or restoration.

Figure 11:
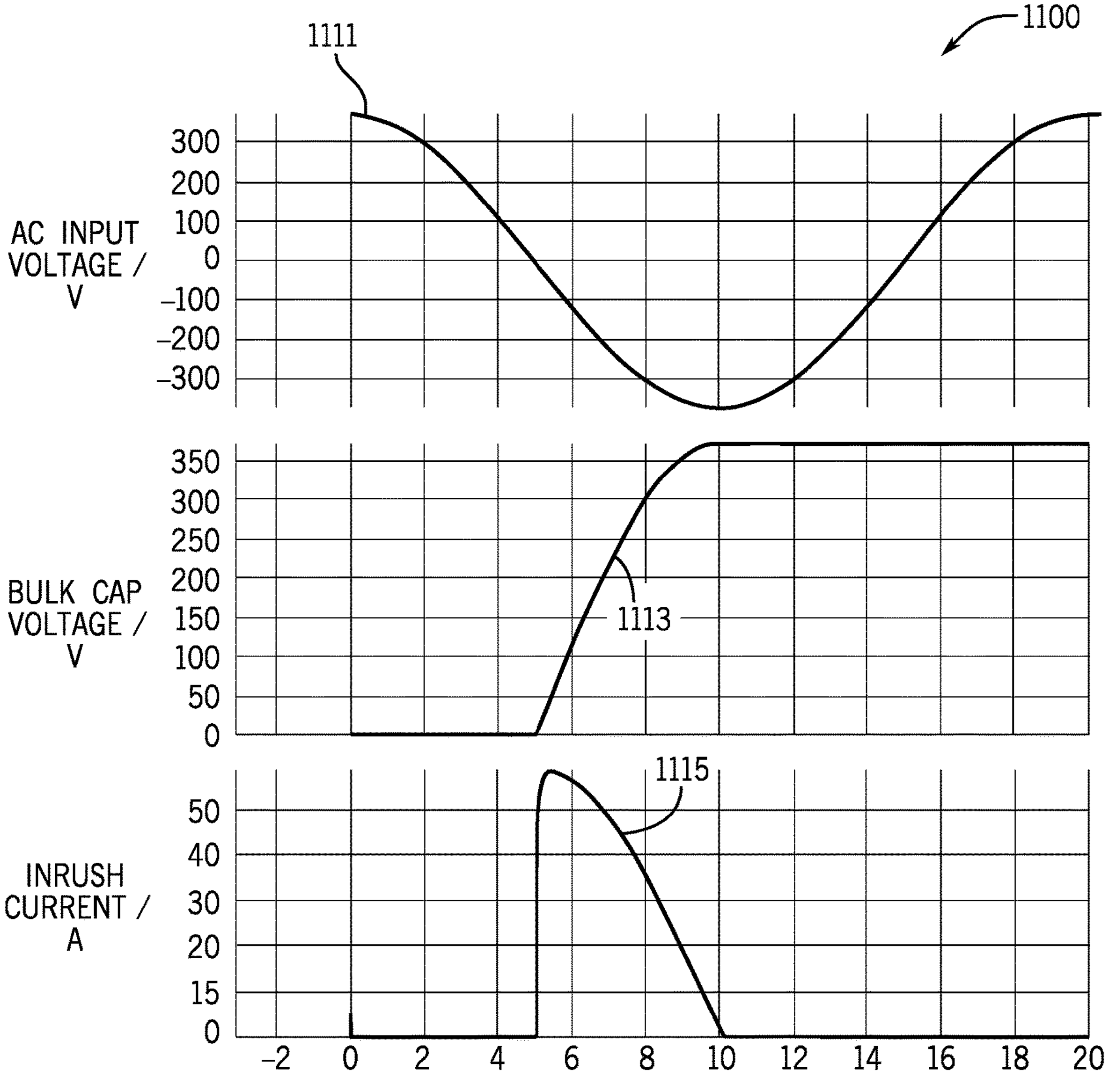
FIG. 11 illustrates inrush current of an AC-DC power supply with inrush current suppression circuitry as described herein when the AC input is plugged in at a 90-degree phase angle.

FIG. 11 illustrates a plot 1100 showing simulated waveforms for an AC-DC power supply with inrush current limiting circuits as described above implementing the control strategy described above with respect to FIG. 10. More specifically, as depicted by AC input voltage waveform 1111, the AC input voltage is provided to the AC-DC power supply at the phase angle of 90 degrees, at which AC input voltage is at its peak value (e.g., 370V). However, the solid-state switching device Q2 is turned off and blocks the AC input voltage, so that no voltage is applied to the bulk capacitor Cb (as depicted by bulk capacitor voltage waveform 1113). As described above with respect to FIG. 10, the controller (e.g., controller 607/707) can monitor the AC input voltage using its zero-crossing detection circuit 1025. At time 5 ms (corresponding to an AC line frequency of 50 Hz), a zero crossing of the AC input voltage (waveform 1111) is detected. At this time, solid-state switching device Q2 is fully turned on, and the rectified AC input voltage is applied to the bulk capacitor Cb. As a result, the bulk capacitor Cb can be gradually charged by AC input voltage. At 10 ms (again corresponding to a line frequency of 50 Hz), i.e., after one fourth of the AC cycle, the bulk capacitor Cb is charged to about the peak value of AC input voltage, as depicted by bulk capacitor voltage waveform 1113). The inrush current is limited in this case to 60 A, which is much lower than 3 kA inrush current discussed above with reference to FIG. 8. Additionally, this inrush current can be a somewhat safer current value for components of the power supplies and any associated devices, feed circuits, and the like.

The foregoing describes exemplary embodiments of inrush current limiting circuits. Such configurations may be used in a variety of applications but may be particularly advantageous when used in conjunction with computer power supplies, including but not limited to computers with relatively higher power consumption, such as desktop computers, workstations, servers, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power supply comprising:

one or more input stages that receive an AC input voltage and produce a DC bus voltage;

a bulk capacitor that receives the DC bus voltage;

a low power DC-DC converter that converts the DC bus voltage to a first DC output voltage;

a high power DC-DC converter that converts the DC bus voltage to a second DC output voltage connected in parallel with the first DC output voltage;

control circuitry that selectively enables and disables the high power DC-DC converter responsive to load conditions; and an inrush current limiting circuit that includes:

a resistor coupled in series between the one or more input stages and the bulk capacitor so as to limit an inrush current to the bulk capacitor;

a relay responsive to the control circuitry that selectively bypasses the resistor under high load conditions once the bulk capacitor is charged; and a solid-state switching device responsive to the control circuitry that selectively bypasses the resistor under low load conditions once the bulk capacitor is charged.

2. The power supply of claim 1 wherein the one or more input stages that receive an AC input voltage and produce a DC bus voltage further comprise:

a rectifier that receives the AC input voltage and produces a rectified AC voltage; and a power factor correction converter that receives the rectified AC voltage and produces the DC bus voltage.

3. The power supply of claim 1 wherein the resistor is a negative temperature coefficient thermistor.

4. The power supply of claim 1 wherein the resistor is a positive temperature coefficient thermistor.

5. The power supply of claim 1 wherein the resistor is a regular resistor.

6. The power supply of claim 1 wherein the relay has contacts coupled in parallel with the resistor and a coil driven by the control circuitry.

7. The power supply of claim 1 wherein the solid-state switching device includes a MOSFET having source and drain terminals coupled in parallel with the resistor and a gate driven by the control circuitry.

8. The power supply of claim 7 further comprising a gate driver interposed between the control circuitry and the gate of the MOSFET.

9. The power supply of claim 7 further comprising a gate drive and isolator interposed between the control circuitry and the gate of the MOSFET.

10. A power supply comprising:

a bulk capacitor that receives a DC bus voltage;

two or more DC-DC converters that convert the DC bus voltage to a DC output voltage, wherein outputs of the two or more DC-DC converters are connected in parallel;

an inrush current limiting circuit that includes a solid-state switching device coupled in series with the bulk capacitor so as to limit an inrush current to the bulk capacitor; and control circuitry that operates the solid-state switching device responsive to bulk capacitor voltage to limit an inrush current to the bulk capacitor.

11. The power supply of claim 10 wherein the solid-state switching device is a MOSFET operated in the active region to limit the inrush current to the bulk capacitor and operated in the saturation region to improve operating efficiency once the bulk capacitor is charged.

12. The power supply of claim 10 further comprising:

a rectifier that receives an AC input voltage and produces a rectified AC voltage; and a power factor correction converter that receives the rectified AC voltage and produces the DC bus voltage.

* * * * *